United States Patent
Notman et al.

(10) Patent No.: US 8,638,155 B2
(45) Date of Patent: Jan. 28, 2014

(54) LEVEL-SHIFTER CIRCUIT

(75) Inventors: Andrew Notman, Edinburgh (GB);
Mark McCloy-Stevens, Edinburgh (GB)

(73) Assignee: Wolfson Microelectronics plc,
Edinburgh (GB)

( * ) Notice: Subject to any disclaimer, the term of this patent is extended or adjusted under 35 U.S.C. 154(b) by 293 days.

(21) Appl. No.: 12/841,627

(22) Filed: Jul. 22, 2010

(65) Prior Publication Data

US 2011/0018588 A1    Jan. 27, 2011

Related U.S. Application Data

(60) Provisional application No. 61/228,002, filed on Jul. 23, 2009, provisional application No. 61/261,068, filed on Nov. 13, 2009.

(30) Foreign Application Priority Data

Jul. 22, 2009 (GB) ................................... 0912745.7
Oct. 27, 2009 (GB) ................................... 0918790.7

(51) Int. Cl.
*H03L 5/00* (2006.01)

(52) U.S. Cl.
USPC ........................................ 327/308; 333/81 R

(58) Field of Classification Search
USPC .......... 326/62–63, 80–81; 327/306, 333, 308; 333/81 R
See application file for complete search history.

(56) References Cited

U.S. PATENT DOCUMENTS

| 6,049,300 | A  | * | 4/2000  | Shoval ........................... 341/144 |
| 6,154,067 | A  | * | 11/2000 | Cheung ............................. 327/74 |
| 6,157,335 | A  | * | 12/2000 | Suzuki et al. .................. 341/154 |
| 6,268,755 | B1 |   | 7/2001  | Summerlin et al. |
| 6,373,266 | B1 |   | 4/2002  | Carelli, Jr. et al. |
| 6,445,241 | B2 | * | 9/2002  | Gabara .......................... 327/404 |
| 6,642,877 | B2 | * | 11/2003 | Leung ............................ 341/144 |
| 6,982,610 | B2 | * | 1/2006  | Govind ........................... 333/32 |
| 7,541,857 | B1 |   | 6/2009  | Wong et al. |
| 7,560,972 | B1 |   | 7/2009  | Tiew et al. |
| 7,598,715 | B1 |   | 10/2009 | Hariman et al. |
| 7,598,893 | B2 | * | 10/2009 | Gunzelmann et al. ........ 341/144 |
| 2007/0152860 | A1 |   | 7/2007 | Jain |
| 2009/0184697 | A1 | * | 7/2009 | Park .............................. 323/280 |

FOREIGN PATENT DOCUMENTS

JP      2006-129025 A    5/2006

* cited by examiner

*Primary Examiner* — Dinh T. Le
(74) *Attorney, Agent, or Firm* — Dickstein Shapiro LLP

(57) ABSTRACT

A level-shift circuit, comprising: an input, for receiving a first voltage; an output, for outputting a second voltage; a resistor array comprising one or more resistors connected in series to the input; a current sink for providing a current that is independent of the first voltage; a switch arrangement comprising a plurality of switch connections for establishing a selected one from a plurality of force paths between the current sink and the input, the selected force path comprising a selected number of the one or more resistors of said resistor array; and at least one connection between the output and the resistor array that provides a sense path between the resistor array and the output that does not comprise any of the switch connections used to establish each of the plurality of force paths.

32 Claims, 18 Drawing Sheets

LEVEL-SHIFTER CIRCUIT

This application claims the benefit of U.S. Provisional Application No. 61/228,002, filed Jul. 23, 2009, and U.S. Provisional Application No. 61/261,068, filed Nov. 13, 2009.

BACKGROUND OF THE INVENTION

1. Field of the Invention

The present invention relates to the field of electronic circuitry, and in particular to a level-shifting, or floating voltage source, circuit.

2. Description of the Related Art

In electronic equipment in general, and particularly for fast-moving segments such as portable consumer devices (e.g. mobile phones, MP3 players etc), there is a relentless push to use the latest processor technology to increase the device capability and feature set while reducing power and cost. As the next generation of processors becomes available, lower operating voltages are used than in previous-generation processors so as to allow a reduction in process feature size, i.e. W/L, that enables a greater level of integration. This is beneficial in terms of reduced die size, reduced die cost and reduced power consumption.

Such progress results in two design challenges for power supply circuitry (e.g. DC-DC converters) to service these processors: one induced by the choice of the value of the low voltage; the other by battery technology lagging behind the change to lower processor supply voltages.
(i) The reduction in processor supply voltage requires a much tighter control—in absolute terms—of the DC-DC converter output voltage under prevailing processor load and battery conditions. If the control over the processor supply voltage is not sufficient, problems with under- or overvoltage may occur; both are equally undesirable.
(ii) Since the battery terminal voltage has not dropped appreciably, and the duty cycle of a DC-DC converter is given by the ratio of $V_{OUT}/V_{IN}$, duty cycles must therefore reduce. This, coupled with the desire for small external components, pushes the DC-DC converter to high operating frequencies, resulting in extremely short switch on i.e. conduction, times. The increase in switching speed afforded by the reduction in transistor feature size is not normally available for the power switches since the interface components must be rated to battery voltage.

Since small conduction periods i.e. on times, of the power switches are difficult to control, a more robust method needs to be found in order to control the lower processor output voltages with adequate accuracy. Fortunately, one such method exists: Valley Current Mode (VCM). This method of DC-DC loop control controls the input transistor off i.e. non-conduction, time, rather than the on time. For the low duty cycle required, the non-conduction time is longer than the conduction time, so is therefore easier to control. Also VCM DC-DC converters are known to offer an inherently higher bandwidth and an improved transient response Consider a buck converter, with an inductor switched between a supply $V_{IN}$ and Ground by a PMOS transistor and an NMOS transistor respectively. Under high or medium current demand, the inductor current, composed of an average component and a ripple, remains above zero through every cycle. This is termed Continuous Conduction Mode (CCM). As the load current demand decreases, it is advantageous for efficiency reasons to alter the control so that the current in the inductor goes to zero for some of each cycle to avoid ripple being large enough to cause a reverse in the current in the inductor. This is termed Discontinuous Current Mode (DCM). At even lower load currents it is advantageous to "pulse-skip" so the PMOS switch does not recharge the inductor in some cycles, but this can lead to undesired behaviour.

These various modes present different control problems and dynamics, and it is important to be able to transition between modes seamlessly without transients appearing during change over. There is also the opportunity for other modes, where current is saved by using simpler control schemes adequate for lower currents, such as unclocked hysteretic modes. For low currents, it may even be advantageous to use a linear regulator such as an LDO (Low Drop Out) regulator rather than a switched voltage regulator. For optimum performance the open-loop transfer function has to be tightly toleranced, and internal signal swings maximized.

FIG. 1 shows a typical application where processor circuitry 101, which may, for example, be a processor of a portable electronic device, is supplied with a voltage $V_{OUT}$ (102) by a DC-DC converter 100. The DC-DC converter 100 receives an input voltage $V_{IN}$ (103) and an external clock signal CLK (104) and outputs the required voltage output $V_{OUT}$(102). It is usual for the supply voltage of a processor to be reduced when the processor is idling in order to save power, and then to ramp up to a more normal operating voltage where the processor may achieve full operating speed. The processor circuitry 101 therefore provides voltage select signals $V_{SEL}$ (105) to the DC-DC converter 100 to select an appropriate voltage output $V_{OUT}$. The voltage select signals may be digital signals for controlling a programmable element of the DC-DC converter, such as a level shifter, as will be described later. The DC-DC converter 100 may also be operable in various modes, as will be described later, and the processor circuitry may select a particular mode of operation by appropriate mode control signals MODE (106). It will be appreciated that DC-DC converters may be used to provide power to device sub-systems other than processors and the embodiments described herein are generally applicable to any DC-DC converter or switched voltage regulator used for any application.

A conventional current-mode buck (i.e. step down) DC-DC converter 200 is shown in simplified form in FIG. 2. The converter 200 comprises two nested feedback loops, an inner Current Control loop and an outer Voltage Control loop.

The Current Control loop block 201 takes an input signal $V_{ERROR}$ and a current sense signal ISNS fed back from the output stage and generates pulse-width modulated drive signals for the output stage 202. The voltage on the output stage output node LX is switched between ground and supply, $V_{IN}$, at a controlled duty cycle, resulting in a triangular current waveform in the inductor L. The inductor L and output capacitor C1 act as a filter to reduce voltage ripple on the average voltage $V_{OUT}$ at an output node 203.

In operation the inductor current is sensed, and compared with $V_{ERROR}$. So this feedback loop generates an output sensed current varying according to the input signal $V_{ERROR}$. In many conventional DC-DC converters the sensed current is a peak current, although it is known to use an average current in some converters. In embodiments of the present invention to be described the minimum or "valley" current is used to control the duty cycle of the converter.

Variation of the delivered output current, smoothed by the output filter L, C1, modulates the output voltage at $V_{OUT}$. This voltage $V_{OUT}$ is fed back, translated down to an appropriate voltage $V_{OUT\_LS}$ by a Level Shifter, or Voltage Shifter, block 204, to the input of a Voltage Error Amplifier block 205. The Voltage Error Amplifier block 205 compares this processed version of $V_{OUT}$ with a supplied reference voltage $V_{REF}$ and provides the error signal $V_{ERROR}$ signal which drives the above described inner feedback loop to close the outer feedback loop and thus stabilize $V_{OUT}$ at the desired voltage.

The Level Shifter 204 is illustrated as a resistive potential divider. The level shifter applies a conversion to the level of $V_{OUT}$ such that, when $V_{OUT}$ is equal to the desired or target output voltage, the level shifted signal $V_{OUT\_LS}$ has a known relationship to the reference voltage $V_{REF}$ (e.g. the level shifted signal $V_{OUT\_LS}$ may be equal to $V_{REF}$ when $V_{OUT}$ is exactly the desired output voltage). The Level Shifter 204 may be programmable, mechanically or digitally, to provide different voltage scaling or shifting circuitry, so as to allow the converter to be configurable to output different values of $V_{OUT}$. For instance, it may be programmable by a digital multi-bit signal, such as the $V_{SEL}$ signal generated by a processor as shown in FIG. 1.

The Voltage Error Amplifier 205 is illustrated as an Operational Transconductance Amplifier (OTA) 206 driving an RC network 207, but could be some other amplifier. Generally it may include some passive impedances to provide closed-loop stabilization.

The Current Loop Control block 201 receives a signal 208 from the output stage 202 which passes through a Current Sensor Amp block 209 to pre-condition it, for instance to scale or strobe the signal, representative of the inductor current, to generate a convenient current sense signal ISNS. A duty modulator 210 compares the ISNS signal to the input $V_{ERROR}$ to derive drive signals of the appropriate duty cycle to drive the output stage devices (10, 20) on and off via a Switch Driver buffer stage 211. The Duty Modulator 210 may require a clock signal 212 and a Ramp Generator 213 to generate the necessary sequence of pulses as would be understood by one skilled in the art. The Ramp Generator 213 may generate a slope compensation ramp signal which may be added either in whole or in part to the ISNS signal and/or the $V_{ERROR}$ signal so as to prevent sub-harmonic oscillations as would be well understood by one skilled in the art.

The Output Stage 202 in general will have a high-side driver device such as a PMOS transistor 10 to switch the output to the high-side supply rail 214 ($V_{IN}$) and a low-side driver device such as an NMOS transistor 20 to switch the output to the low-side supply rail 215 (Ground). The Stage 202 is also required to supply information, i.e. an indication, of inductor current signal 208, to feed back to the Current Control block 201.

The DC-DC converter 200 of FIG. 2 requires a voltage shifter, e.g. a potential divider, to translate the output voltage $V_{OUT}$ down to a (nominally) convenient reference voltage. Also this is a convenient place to adjust or trim the converter output voltage $V_{OUT}$ by use of a programmable voltage shifter.

FIG. 3 shows one way of creating a variable output voltage for the DC-DC converter 200. A programmable level shifter block 204 is shown, connected to an OTA block 206, such as described previously with respect to FIG. 2.

The programmable level shifter block 204 comprises a first resistor 301 and a second resistor 302 connected in series in a resistive potential divider arrangement. The level-shifted voltage $V_{OUT\_LS}$ is taken from a node in between the two resistors 301, 302. The level-shifted voltage $V_{OUT\_LS}$ is provided to an inverting input of the OTA block 206, with a $V_{REF}$ block 303 providing a reference voltage $V_{REF}$ to the non-inverting input.

In operation, the OTA 206 and the other components of the feedback loops will adjust $V_{OUT}$ until $V_{OUT\_LS}$ becomes equal to $V_{REF}$. Then $V_{OUT}=V_{REF}+\Delta V$ where $\Delta V=V_{REF}$ where $\beta=R301/R302$. The output voltage of the DC-DC converter 200 may thus be programmed by arranging the first resistor 301 in block 204 as a programmable resistance, programmed using the $V_{SEL}$ digital bus. The output voltage may also be programmed by making the second resistor 302 in block 204 an element with programmable conductance.

However, both of these programming solutions suffer from a common problem in that as the voltage codes are changed (i.e. the programmable resistance or conductance is altered), the gain from $V_{OUT}$ to $V_{OUT\_LS}$ provided by the level-shifter block 204 changes as $1/(1+\beta)$. Since this gain is a factor in the overall open-loop gain response, this results in extra variation in the voltage error loop gain-bandwidth or unity gain frequency, especially in cases where a large variation in voltage is required. The extra design margin to achieve adequate closed-loop gain accuracy and stability, for example, despite this extra tolerance, impacts the performance typically exhibited (for instance the transient recovery response time and overshoot). A more subtle problem with the programmable conductance approach is that it uses large resistor values which may consume large areas of silicon real estate.

SUMMARY OF THE INVENTION

According to a first aspect of the invention, there is provided a level-shift circuit, comprising: an input, for receiving a first voltage; an output, for outputting a second voltage; a resistor array comprising one or more resistors connected in series to the input; a current sink for providing a current that is independent of the first voltage; a switch arrangement comprising a plurality of switch connections for establishing a selected one from a plurality of force paths between the current sink and the input, said selected force path comprising a selected number of said one or more resistors of said resistor array; and at least one connection between the output and the resistor array that provides a sense path between the resistor array and the output that does not comprise any of said switch connections used to establish each of said plurality of force paths.

The present invention therefore provides a level-shifter, or voltage-shifter, block, which provides an output voltage that is a predictable and accurate function of its input voltage. The level-shift circuit can robustly handle input voltages that vary during use. Moreover, the level-shifting block has unity small-signal gain regardless of the particular level shift that is selected.

According to a second aspect of the present invention, there is provided a circuit comprising a level-shift circuit as defined above. The level-shift circuit is placed in a feedback loop and the second voltage compared with a reference voltage in control circuitry. The control circuitry thereby generates an output voltage, and this is fed back, in one embodiment, as the first voltage of the level-shift circuit.

The current sink in the level-shift circuit is therefore held at a substantially constant level at, or just below, the reference voltage, but above that required to operate correctly.

BRIEF DESCRIPTION OF THE DRAWINGS

For a better understanding of the present invention, and to show more clearly how it may be carried into effect, reference will now be made, by way of example, to the following drawings, in which:

FIGS. 4b to 4d show modes of operation of the level-shifting circuitry illustrated in FIG. 4a;

FIGS. 7b to 7d show modes of operation of the level-shifting circuitry illustrated in FIG. 7a;

DETAILED DESCRIPTION

Figure 1:
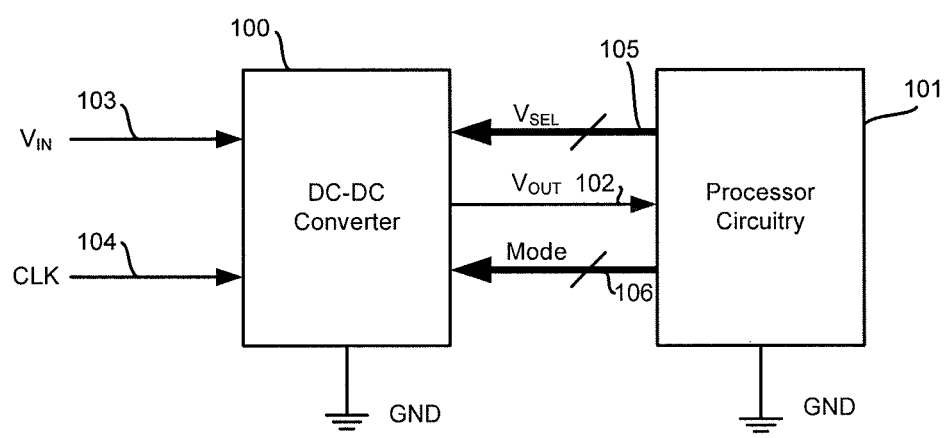
FIG. 1 shows a DC-DC converter supplying processor circuitry.
Figure 2:
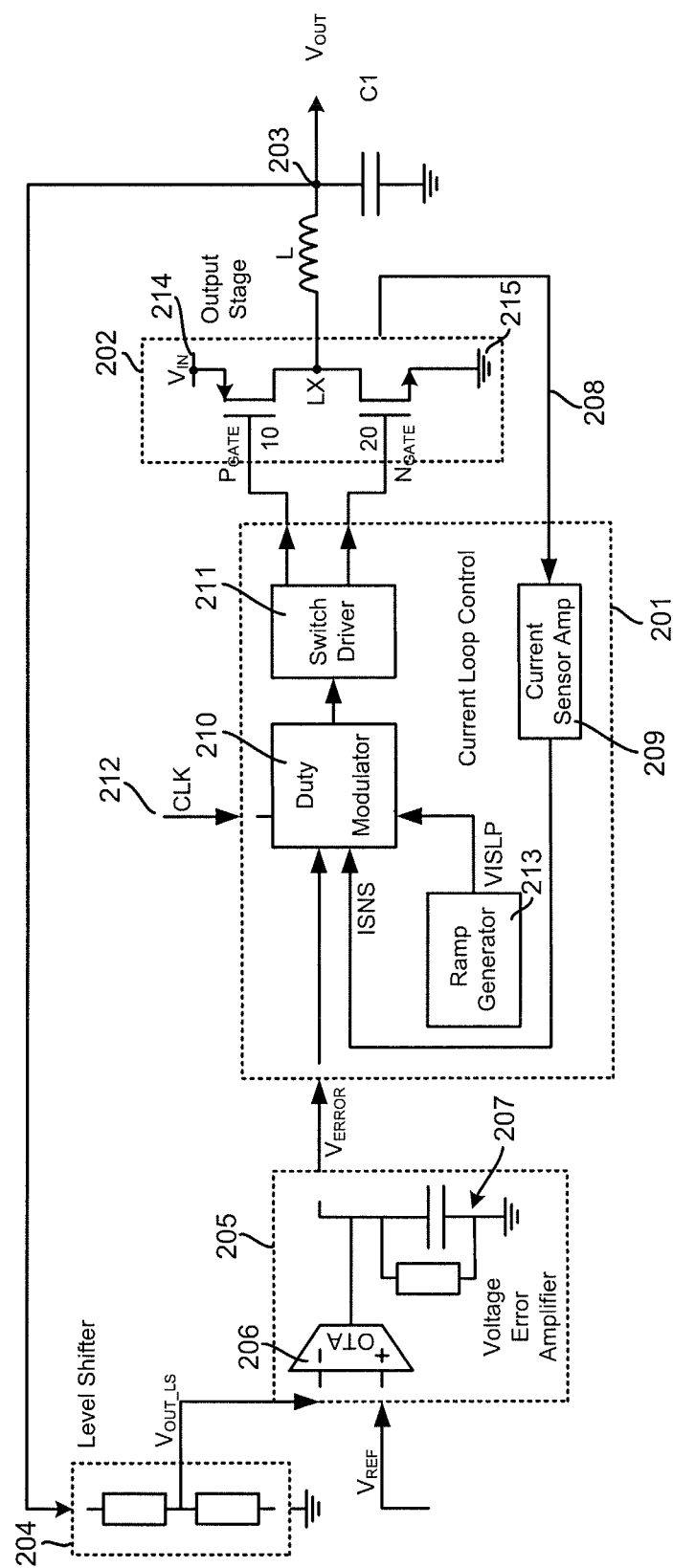
FIG. 2 shows an example of a DC-DC converter.
Figure 3:
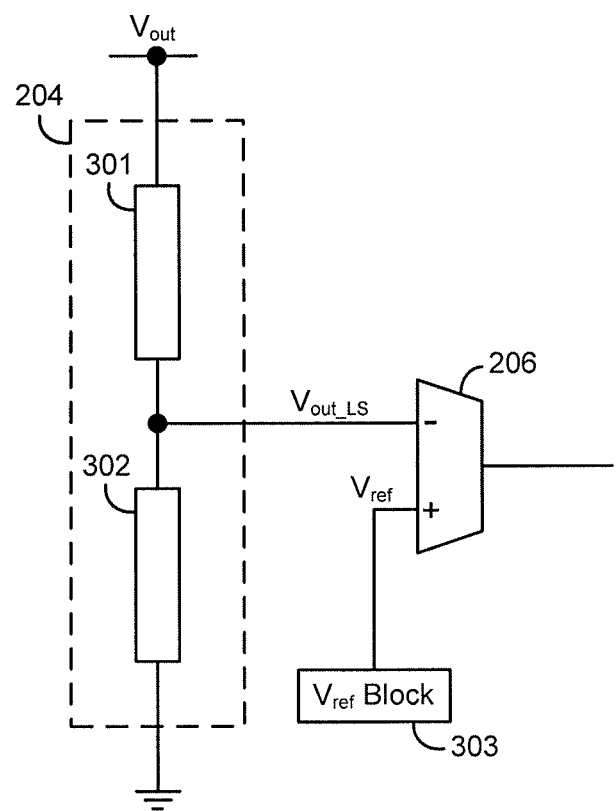
FIG. 3 shows an example of level-shifter circuitry for use in the DC-DC converter of FIG. 2.
Figure 4A:
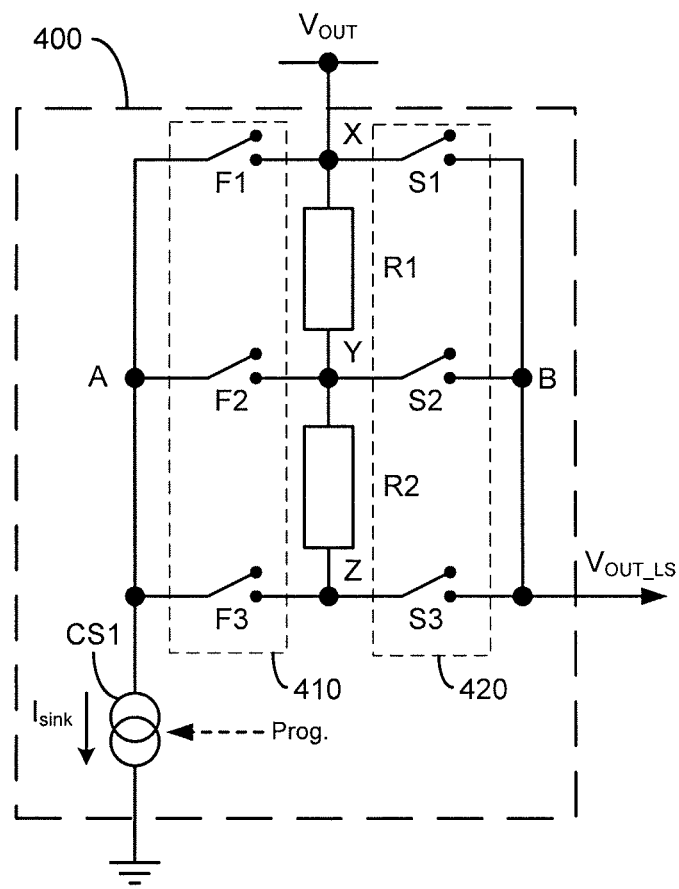
FIG. 4a shows level-shifting circuitry according to an embodiment of the present invention.

FIG. 4a shows a level-shifting circuit 400 according to some embodiments of the present invention. It will be apparent to those skilled in the art that any of the level-shifting circuitry described herein is suitable for use as the level-shifting circuitry block 204 in the DC-DC converter 200 described with respect to FIG. 2. However, the level-shifting circuitry is also suitable for use in other applications. For consistency throughout the specification, the input voltage of the level-shifting circuits described hereinafter is labelled $V_{OUT}$, and the output voltage of the level-shift circuits is labelled $V_{OUT\_LS}$.

The level-shifting circuit 400 comprises an input, for receiving a voltage $V_{OUT}$. Connected in series to the input is a first resistor R1, and connected in series to the first resistor R1 is a second resistor R2. Three nodes X, Y and Z are interleaved with the two resistors R1 and R2. Node X is connected between the input and the first resistor R1; node Y is connected between the first resistor R1 and the second resistor R2; and node Z is connected after the second resistor R2.

Connected to each of the nodes X, Y, Z is a respective pair of switches (or a respective switch network), comprising a force switch and a sense switch. The pair of switches comprising a force switch F1 and a sense switch S1 is coupled to node X; the pair of switches comprising a force switch F2 and a sense switch S2 is coupled to node Y; and the pair of switches comprising a force switch F3 and a sense switch S3 is coupled to node Z. The plurality of force switches comprises a force switching arrangement 410 (or a force switch network), and the plurality of sense switches comprises a sense switching arrangement 420 (or a sense switch network).

A node A is connected to each of the force switches F1, F2, F3 in the force switch arrangement 410; and a node B is connected to each of the sense switches S1, S2, S3 in the sense switch arrangement 420.

The level-shift circuit 400 further comprises a current sink CS1 that is connected at one terminal to node A, and at the other terminal to a voltage (in the illustrated embodiment this voltage is ground) for example. The current sink CS1 develops a current $I_{sink}$.

An output of the level-shift circuit 400 is connected to node B, for providing the level-shifted voltage $V_{OUT\_LS}$.

The voltage at each respective node represents one possible "level shift" ($V_{OUT}-V_{OUT\_LS}$) of the voltage $V_{OUT}$, depending on which switches are closed. Thus, it is desirable that the voltage $V_{OUT\_LS}$ of the level-shift circuit 400 should correspond as accurately as possible to the voltage at one of these nodes X, Y, Z.

In operation, one of the pairs of switches is closed at any one time so that the voltage at the respective node of that switch pair may be output as the level-shifted voltage $V_{OUT\_LS}$. For example, switches F1 and S1 are closed to generate and read the voltage at node X; switches F2 and S2 are closed to generate and read the voltage at node Y; and switches F3 and S3 are closed to generate and read the voltage at node Z.

When one of the force switches is closed, the circuit path between $V_{OUT}$, possibly one or more of the resistors R1 and R2, the closed force switch, the current sink CS1 and ground is completed. The current sink CS1 is designed such that its output current is independent of the voltage across it, within some operating range, so that a constant current $I_{sink}$ is pulled through whatever circuit is attached to its output terminal. The magnitude of the current $I_{sink}$ may be adapted depending on the desired operation of the level-shift circuit 400; that is, the current sink CS1 may be programmable (e.g. with a control signal Prog as shown in FIG. 4a) to sink a certain value of current $I_{sink}$ chosen for example based on the range and resolution desired of the level shifter for a particular application or anticipated conditions of operation. However, in operation the current is at least semi-statically defined such that it does not vary during use, i.e. when switching from one programmed output voltage to another. A more detailed explanation of one embodiment of the current sink CS1 is given with reference to FIG. 9; however, many different designs will be apparent to those skilled in the art. Also element CS1 may alternatively be termed a current source, especially in embodiments where $V_{IN}$ is negative and the polarity of its supplied current would be opposite.

The constant current from current sink CS1 imposed across R1 and/or R2 provides a voltage drop between $V_{OUT}$ and $V_{OUT\_LS}$ which is independent of $V_{OUT}$. In other words, the level shifter provides a floating programmable voltage source between $V_{OUT}$ and $V_{OUT\_LS}$. So for a.c. signals there is unity gain between $V_{OUT}$ and $V_{OUT\_LS}$, irrespective of the selection of R1 and/or R2, compared to the potential divider solution where the a.c. gain between $V_{OUT}$ and $V_{OUT\_LS}$ is the same as the d.c. gain. Thus, when used as the level-shifter in the DC-DC converter 200 for example, such a level-shift circuit 400 provides the benefit of providing an overall loop gain, and therefore bandwidth, that is held substantially constant, i.e. independent of the programmed output voltage.

The current sink CS1 is preferably created using a voltage reference and the same resistor type as that present in the resistor string. This makes the voltage dropped across R1 a predetermined constant proportion of the voltage reference used to create $I_{sink}$.

Further, the output of the level-shift circuit 400 should preferably, for optimum performance, be coupled to a relatively high input impedance component. For example, when employed in a DC-DC converter such as that disclosed in FIG. 2, a high impedance may be provided in the inverting input to the OTA 206. For example if the OTA is implemented with MOS input transistors, the OTA input current will be MOS gate leakage current, likely to be negligible. Leakage on this node would probably be dominated by that of the semiconductor junctions or subthreshold channel leakage of any MOS switches employed, but would still be likely to be negligible. Even a bipolar transistor input stage may be designed with care to require a low enough input base current in relation to the impedance of the resistor network.

The combined operation of the current sink CS1 and the high impedance output load is to steer substantially all of the current flowing from the high-side (i.e. input) of the level-shift circuit through the force switch of the closed switch pair and to the current sink CS1. Substantially no current, other than very low levels of leakage current, flows through the sense switch of the closed switch pair, due to the high impedance presented to the output. Therefore, there is negligible voltage drop across the sense switch.

The switches of each pair may be controlled separately by action of two signals, or by a single control signal. In one embodiment, non-overlapped control signals are employed such that two or more pairs of switches are not closed at the same time, resulting in a well-defined level-shifted voltage at all times, possibly with the aid of parasitic capacitances the might be adequate to hold the level-shifter output voltage during the short time when all switches are off. In other embodiments two or more pairs of switches may be deliberately closed at the same time during a transition, to produce an intermediate voltage during this time, perhaps to give a smoother level-shifter output voltage transition.

Figure 4B:
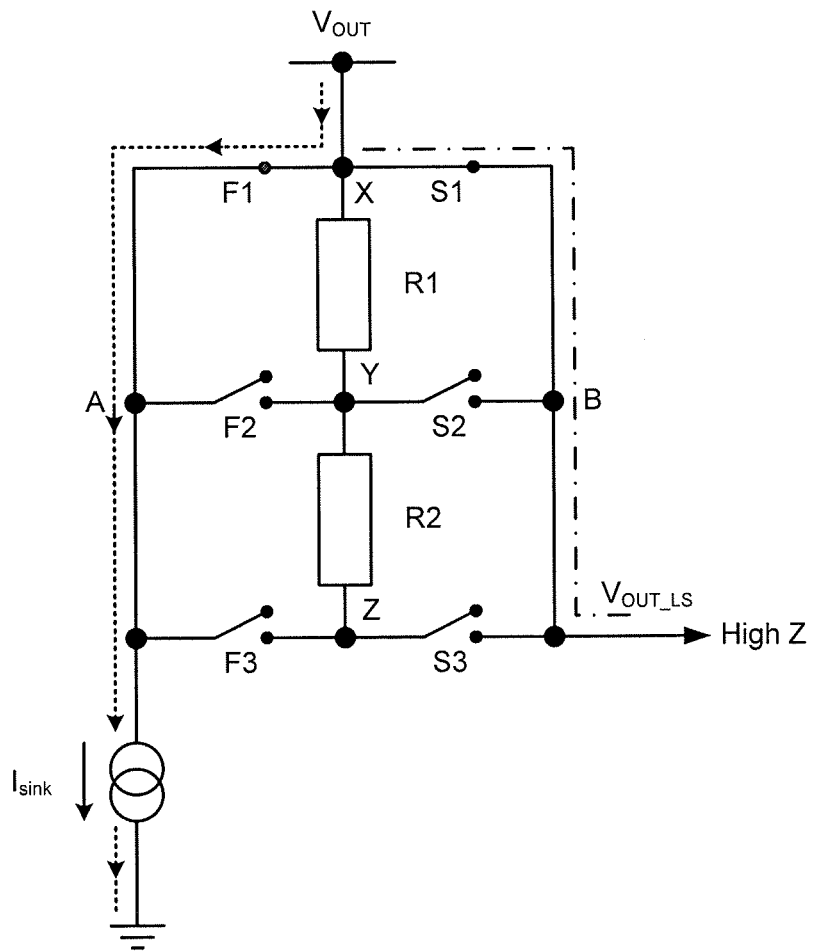

FIG. 4b shows the operation of the level-shift circuit 400 when the first pair of switches F1, S1 is closed. The two other pairs of switches F2, S2 and F3, S3 are both open. The desired outcome of this mode of operation is to provide a level-shifted voltage $V_{OUT\_LS}$ that is the same as the input voltage $V_{OUT}$.

The dotted line shows the flow of the majority of the current (i.e. the "substantially all" of the current that is forced through the force switch F1). The chain line in FIG. 4b shows the 'sense' path. The voltage at node X is $V_{OUT}$, and the voltage at node A is $V_{OUT}-(I_{leak} \cdot R_{ONF1})$, where $R_{ONF1}$ is the on-resistance of the force switch F1, and $I_{leak}$ is the leakage current flowing in the sense path. The sense switch S1 also has an on-resistance; however, because substantially no, or at least negligible, current flows through the sense switch S1 as mentioned above, the voltage at node B is substantially $V_{OUT}$. That is, there is no, or at least negligible, voltage drop across the sense switch S1. The level-shifted voltage $V_{OUT\_LS}$ is therefore, to a first order, substantially equal to $V_{OUT}$.

Figure 4C:
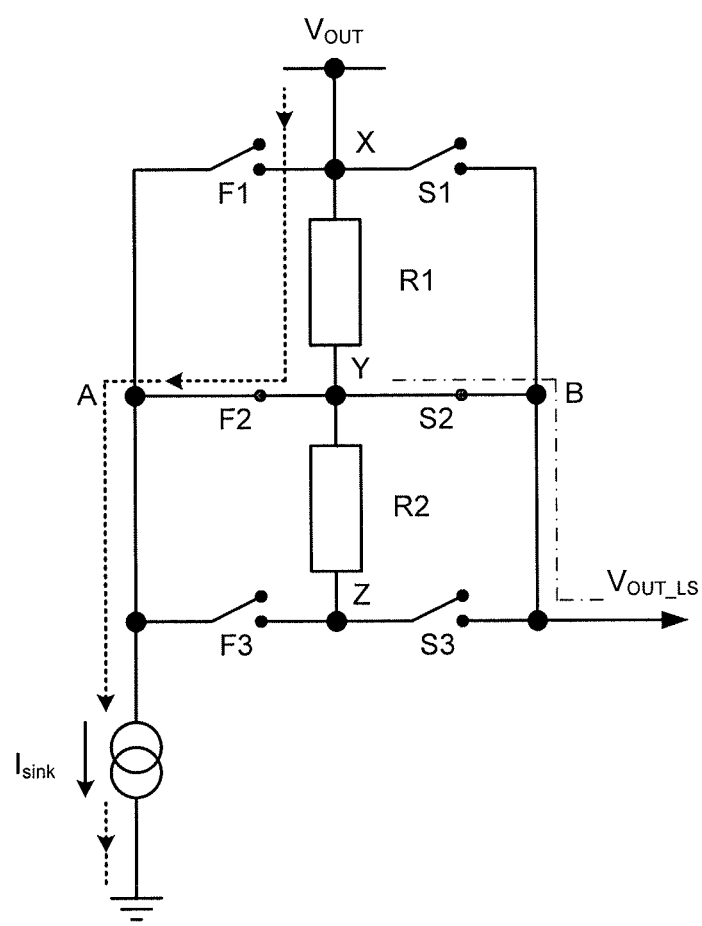

FIG. 4c shows the operation of the level-shift circuit 400 when the second pair of switches F2, S2 is closed. The two other pairs of switches F1, S1 and F3, S3 are both open. The desired outcome of this mode of operation is to provide a level-shifted voltage $V_{OUT\_LS}$ that is equal to the input voltage $V_{OUT}$ shifted down by an amount $I_{sink} \cdot R1$, i.e. $V_{OUT\_LS}=V_{OUT}-I_{sink} \cdot R1$.

The dotted line shows the flow of the majority of the current (i.e. the "substantially all" of the current that is forced through the force switch F2). The chain line in FIG. 4c shows the 'sense' path. The voltage at node X is $V_{OUT}$, and the voltage at node Y is $V_{OUT}-I_{sink} \cdot R1$. The voltage at node A is therefore $V_{OUT}-(I_{sink} \cdot R1)-(I_{leak} \cdot R_{ONF2})$, where $R_{ONF2}$ is the on-resistance of the force switch F2. The sense switch S2 also has an on-resistance; however, because substantially no current flows through the sense switch S2 as mentioned above, the voltage at node B is substantially equal to $V_{OUT}-(I_{sink} \cdot R1)$. That is, there is no, or at least negligible, voltage drop across the sense switch S2. The level-shifted voltage $V_{OUT\_LS}$ is therefore substantially equal to $V_{OUT}-(I_{sink} \cdot R1)$.

Figure 4D:
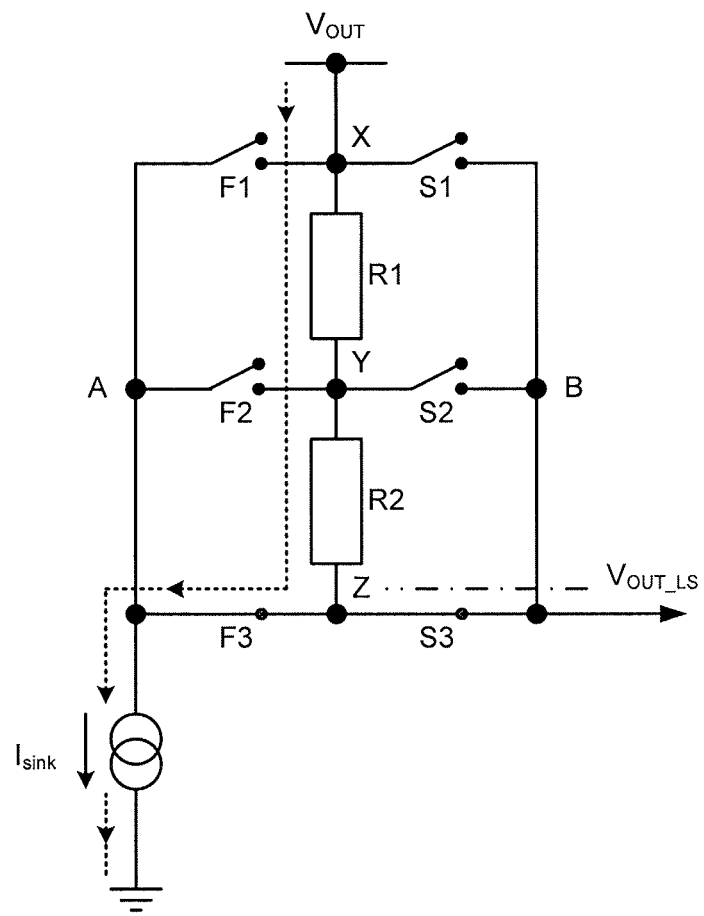

FIG. 4d shows the operation of the level-shift circuit 400 when the third pair of switches F3, S3 is closed. The two other pairs of switches F1, S1 and F2, S2 are both open. The desired outcome of this mode of operation is to provide a level-shifted voltage $V_{OUT\_LS}$ that is the same as the input voltage $V_{OUT}$ shifted down by an amount $I_{sink} \cdot (R1+R2)$, i.e. $V_{OUT\_LS}=V_{OUT}-I_{sink} \cdot (R1+R2)$.

The dotted line shows the flow of the majority of the current (i.e. the "substantially all" of the current that is forced through the force switch F3). The chain line in FIG. 4d shows the 'sense' path. The voltage at node X is $V_{OUT}$, the voltage at node Y is $V_{OUT}-(I_{sink} \cdot R1)$ and the voltage at node Z is $V_{OUT}-(I_{sink} \cdot R1)-(I_{sink} \cdot R2)$. The voltage at node A is $V_{OUT}-(I_{sink} \cdot R1)-(I_{sink} \cdot R2)-(I_{leak} \cdot R_{ONF3})$, where $R_{ONF3}$ is the on-resistance of the force switch F3. The sense switch S3 also has an on-resistance; however, because substantially no current flows through the sense switch S3 as mentioned above, the voltage at node B is substantially equal to $V_{OUT}-(I_{sink} \cdot R1)-(I_{sink} \cdot R2)$. That is, there is no, or at least negligible, voltage drop across the sense switch S3. The level-shifted voltage $V_{OUT\_LS}$ is therefore substantially equal to $V_{OUT}-(I_{sink} \cdot R1)-(I_{sink} \cdot R2)$.

Thus it can be seen that the level-shift circuit 400 provides three possible level-shifted voltages for any particular input voltage, based on selective use of its two resistors R1 and R2 to shift the input voltage. The provision of force—sense switch pairs allows the level-shift circuit 400 to provide a level-shifted voltage that is a well-controlled and predictable function of the input voltage. The vast majority of the current is forced through the force switch of the closed pair, and only a negligible amount of current, representative of leakage current, flows through the sense switch. Thus, zero or negligible voltage is dropped across the sense switch as a result of its on-resistance, and the level-shifted voltage is an accurate representation of the voltage at the selected node of the string of resistors R1, R2.

In use as the level-shifter 204 in DC-DC converter, for example, as previously remarked, the control loops in the DC-DC converter will adjust $V_{OUT}$ so that $V_{OUT\_LS}$ is equal to $V_{REF}$. The level-shift circuit 400 can then be regarded as providing three possible amounts of level shift, $(V_{OUT}-V_{OUT\_LS})$, based on selective use of its two resistors R1 and R2 to shift the input voltage. Since $V_{OUT\_LS}$ is kept equal to the fixed voltage $V_{REF}$ this will result in three different values of converter output voltage $V_{OUT}$. The provision of force—sense switch pairs allows the level-shift circuit 400 to provide these three values of regulator output voltage $V_{OUT}$ that are well-controlled and predictable functions of the known and accurate reference voltage $V_{REF}$. The vast majority of the current is forced through the force switch of the closed pair, and only a negligible amount of current, representative of leakage current, flows through the sense switch. Thus, zero or negligible voltage is dropped across the sense switch as a result of its on-resistance, and the level-shifted voltage $V_{OUT\_LS}$ is an accurately level-shifted version of $V_{OUT}$ at the selected node of the string of resistors R1, R2.

So in use as the level-shifter 204 in DC-DC converter a voltage $V_{REF}$ will appear across the current source CS1.

In contrast, if the force switches were absent, and CS1 connected permanently to the lower end of R2, then:
 i) If sense switch S3 were closed, the voltage across CS1 would still be equal to $V_{REF}$
 ii) If sense switch S2 were closed, the voltage across CS1 would now be $V_{OUT\_LS}-I_{sink} \cdot R2=V_{REF}-I_{sink} \cdot R2$
 iii) If sense switch S2 were closed, the voltage across CS1 would now be $V_{OUT\_LS}-I_{sink} \cdot R1-I_{sink} \cdot R2=V_{REF}-I_{sink} \cdot R1-I_{sink} \cdot R2$ Thus depending on the switch settings, the voltage across CS1 could be much reduced. For a practical current source, whose output current will usually vary at least to a small degree with output voltage, this may give a variation in $I_{sink}$ that would result in significant inaccuracy in the voltage drops, and hence in $V_{OUT\_Ls}$ and $V_{OUT}$. Indeed if $(I_{sink} \cdot R1+I_{sink} \cdot R2)>V_{REF}$, the voltage across CS1 could even go negative assuming an ideal mathematical current source. A practical current source will only provide a substantially constant current down to a minimum or compliance voltage drop across it.

Returning to the operation including selectable force switches, it can be seen that the constant voltage drop of $V_{REF}$ maintained in steady state across CS1 is advantageous in both being constant (avoiding even small modulation of the current delivered) and in enabling the current source to be designed for a fixed voltage $V_{REF}$, rather than one that is required to also operate at $V_{REF}-(I_{sink} \cdot R1)-(I_{sink} \cdot R2)$, i.e. at a reduced voltage, even if $(I_{sink} \cdot R1+I_{sink} \cdot R2) < V_{REF}$.

Figure 8:
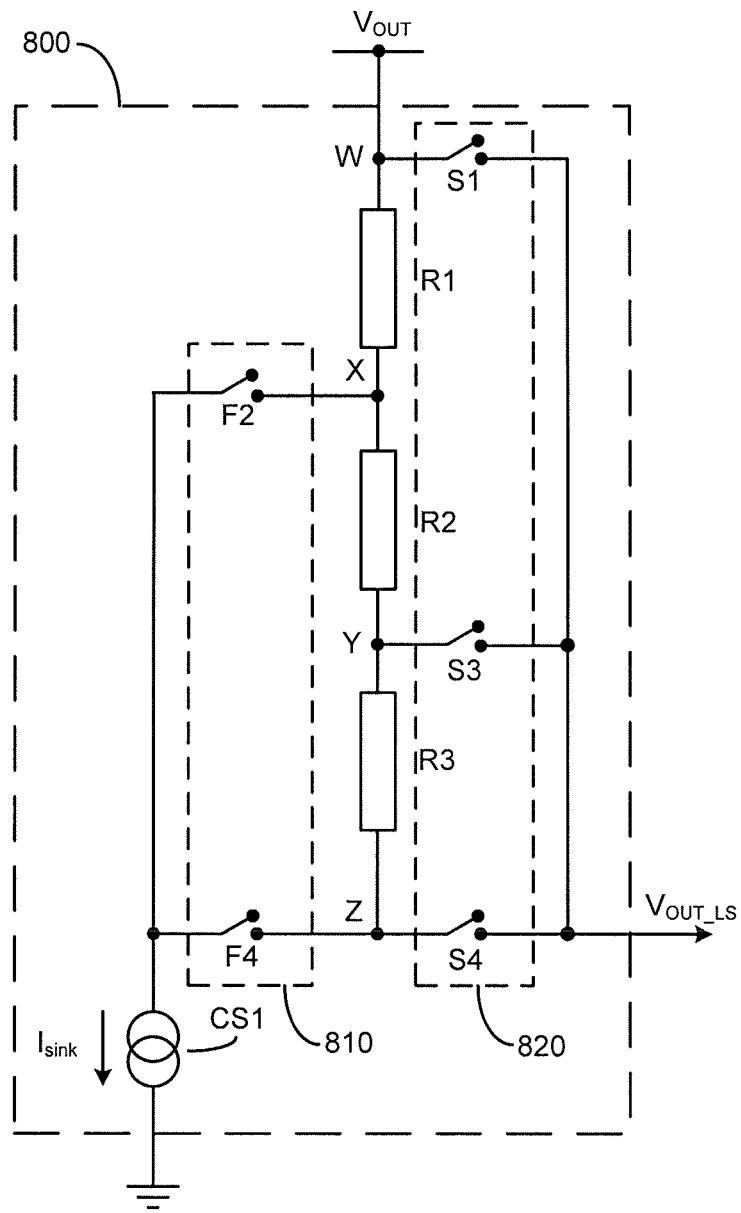
FIG. 8 shows level-shifting circuitry according to another embodiment of the present invention.

Note if the current source is capable of providing an adequately accurate current at a voltage of $V_{REF}-(I_{sink} \cdot R2)$, then the force switch F2 might be omitted, and F3 used to partner sense switch S2, with the advantage of saving the cost or chip area of switch F2 (for example, see the embodiment described with respect to FIG. 8).

Figure 5:
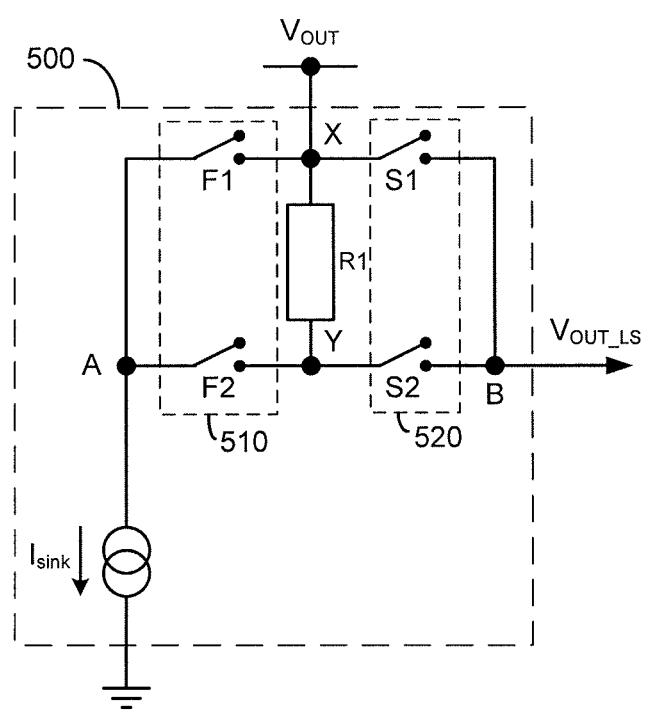
FIG. 5 shows level-shifting circuitry according to another embodiment of the present invention.

The embodiment described above contained two resistors. The skilled person will realize, however, that a level-shift circuit according to the present invention may be provided with any number of resistors. For example, FIG. 5 shows a level-shift circuit 500 according to an embodiment of the present invention with only a single resistor R1 to shift the level of the input voltage $V_{OUT}$. Consequently the force switch arrangement 510 has only two force switches F1 (i.e. a high-side switch) and F2 (i.e. a low-side switch), and the sense switch arrangement 520 has only two sense switches S1 (i.e. a high-side switch) and S2 (i.e. a low-side switch). Switches F1 and S1 are connected to the high side of resistor R1, i.e. that resistor terminal closer to $V_{OUT}$, while switches F2 and S2 are connected to the low side of resistor R1, i.e. that resistor terminal further from $V_{OUT}$.

The level-shift circuit 500 is similar to the level-shift circuit 400 described with respect to FIG. 4a. However, only a single resistor R1, and only two pairs of switches F1, S1 and F2, S2 are provided. Therefore the level-shift circuit 500 provides two possible level-shifted voltages $V_{OUT\_LS}$ for any particular input voltage: $V_{OUT}$ or $V_{OUT}-(I_{sink} \cdot R1)$.

Figure 6A:
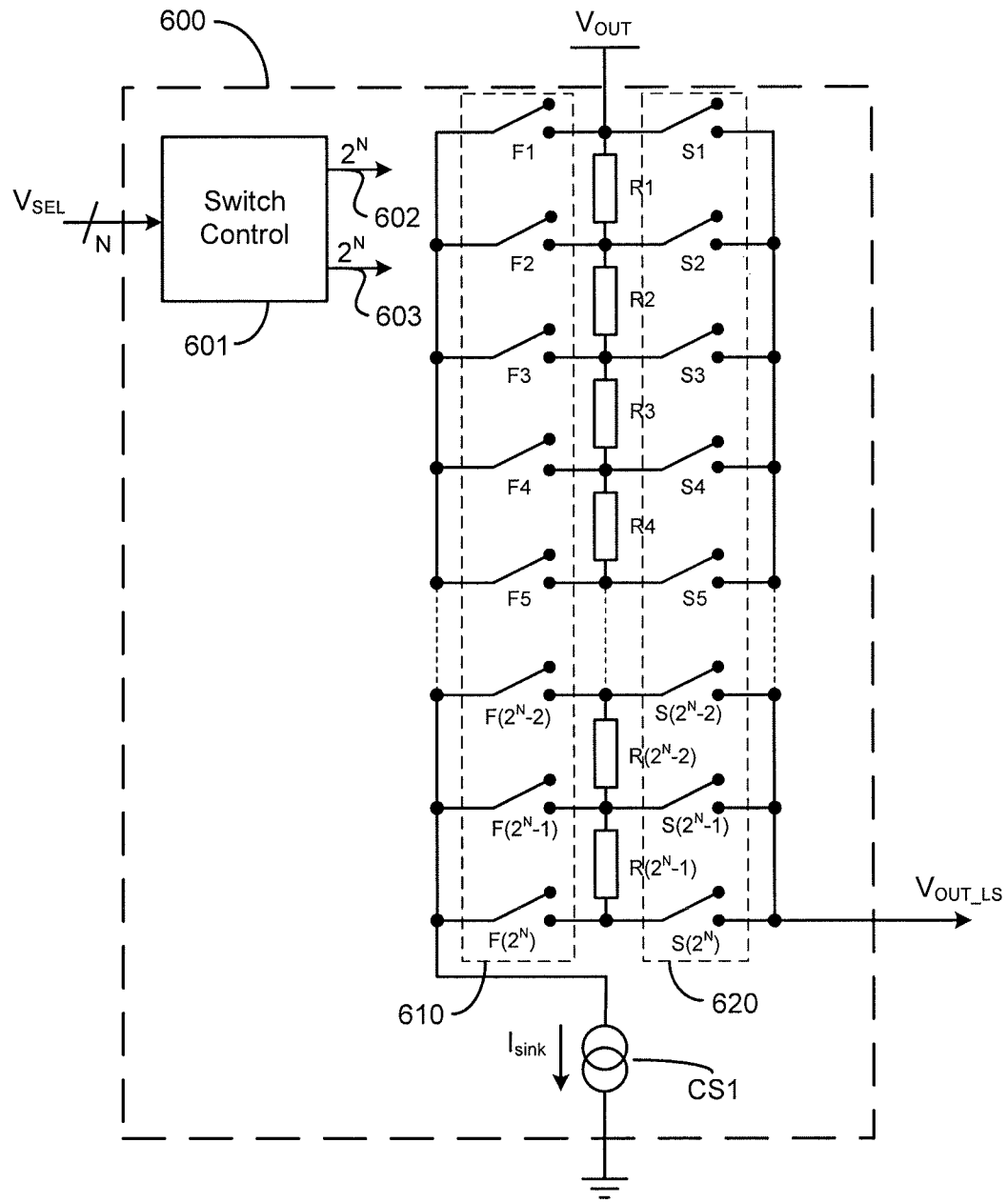
FIGS. 6a, 6b and 6c show level-shifting circuitry according to further embodiments of the present invention.

FIG. 6a shows another level-shift circuit 600 according to an embodiment of the present invention, with a force switch arrangement 610 and a sense switch arrangement 620.

The level-shift circuit 600 comprises an input for receiving an input voltage $V_{OUT}$, and a plurality of resistors R1 to R($2^N$–1) connected in series to the input, where N is a positive integer. Connected before the resistors R1 to R($2^N$–1), after the resistors, and interspersed between the resistors are a plurality of nodes to which respective switch pairs (or switch networks) are connected. Each switch pair comprises a force switch F1 to F($2^N$) and a sense switch S1 to S($2^N$). A current sink CS1 is connected to the other terminals of each force switch. An output of the level-shift circuit is connected to the other terminals of each sense switch.

The level-shift circuit 600 further comprises a switch select block 601 that provides $2^N$ control signals 602 to the respective $2^N$ force switches, and provides $2^N$ control signals 603 to the respective $2^N$ sense switches. In an alternative embodiment, a single control signal may be applied to both force and sense switches in a switch pair, in which case $2^N$ control signals are needed only.

Selection of the switches may be controlled via an N-bit bus supplied to the switch control block 601. For example, in an embodiment where the level-shift circuit is employed in a DC-DC converter 200 such as that described with respect to FIG. 2, the bus may be the $V_{SEL}$ bus 105.

Operation of the level-shift circuit 600 is substantially the same as described above, and so will not be repeated in detail. However, it can be seen that the level-shift circuit 600 provides $2^N$ possible output voltages for a particular input voltage. In one embodiment, each of the resistors R1 to R($2^N$–1) has the same value of resistance; this provides an output voltage that is an easily selectable, linear function of the input voltage. That is, the level-shifted voltage $V_{OUT\_LS}$ will be equal to $V_{OUT}-I_{sink} \cdot (m-1) \cdot R$, where R is the resistance of each resistor, and m is the number of the switch pair that is closed. In general, the level-shifted voltage is equal to:

$$V_{OUT\_LS} = V_{OUT} - I_{sink} \cdot \sum_{i=1}^{i=m-1} R_i$$

for m≥2, or $V_{OUT\_LS}=V_{OUT}$ for m=1.

However, this only holds true where $$V_{OUT} > I_{sink} \cdot \sum_{i=1}^{i=m-1} R_i + Vd_{Sat},$$

$Vd_{Sat}$ is the saturation voltage of the current sink CS1, i.e. the voltage below which the current sink CS1 deliver a significantly decreased current. If the input voltage $V_{OUT}$ falls below this sum of $Vd_{Sat}$ and the voltage drops across the resistors through which current is flowing due to a closed force switch, the current sink CS1 may collapse, i.e. start to deliver a significantly decreased current. However, in the application inside a control loop such as in DC-DC converter 200, $V_{OUT\_LS}$ will always be equal to $V_{REF}$ (save for any transients or ripple voltage) so CS1 is unlikely to saturate.

Figure 6B:
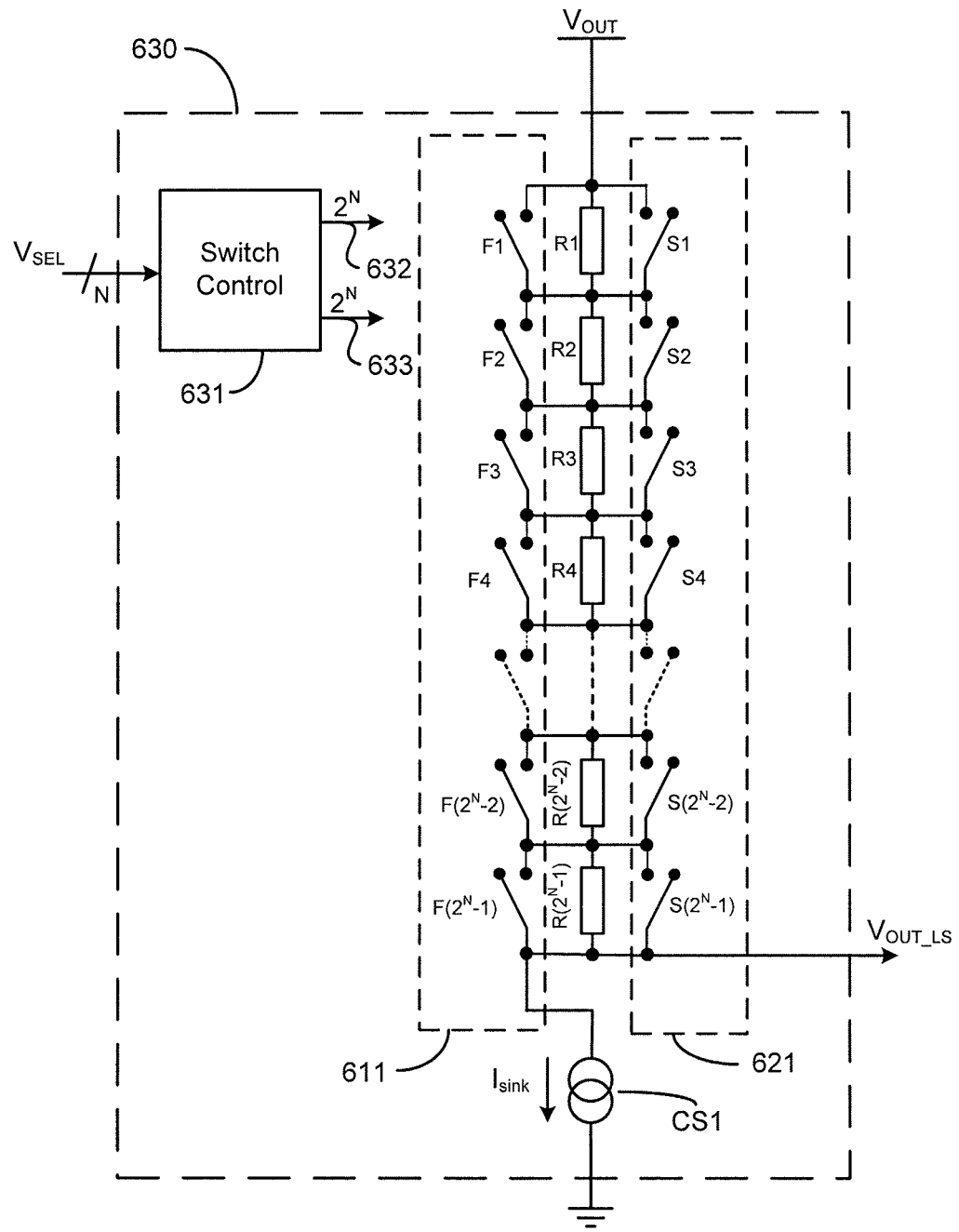

Other configurations for the switch arrangements 610, 620 are possible. For example FIG. 6b shows an embodiment where shunt switches are used. The circuit 630 according to this embodiment has a plurality of force shunt switches in a force switch arrangement 611 and a plurality of sense shunt switches in a sense switch arrangement 621. This has the advantage that the MOS switches may be laid out with shared diffusions to provide a compact layout.

Figure 6C:
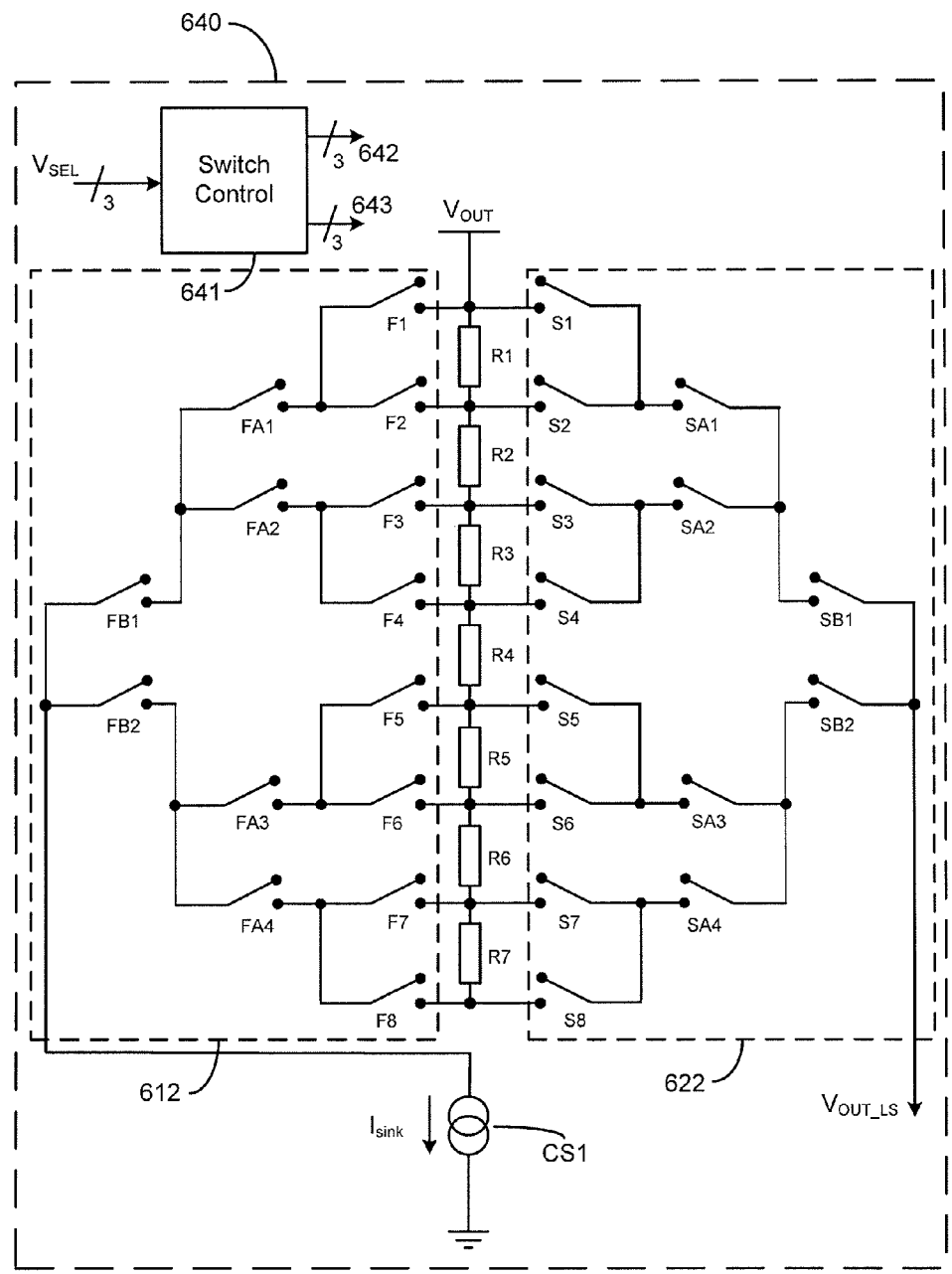

FIG. 6c shows an embodiment where switching is implemented using a binary tree, avoiding the need for any digital decoding of the control signals from the switch control block 630, 631. In this (3-bit) case each force "switch" path actually comprises three series switches. Combinations of these schemes would be obvious to a skilled person.

Figure 7A:
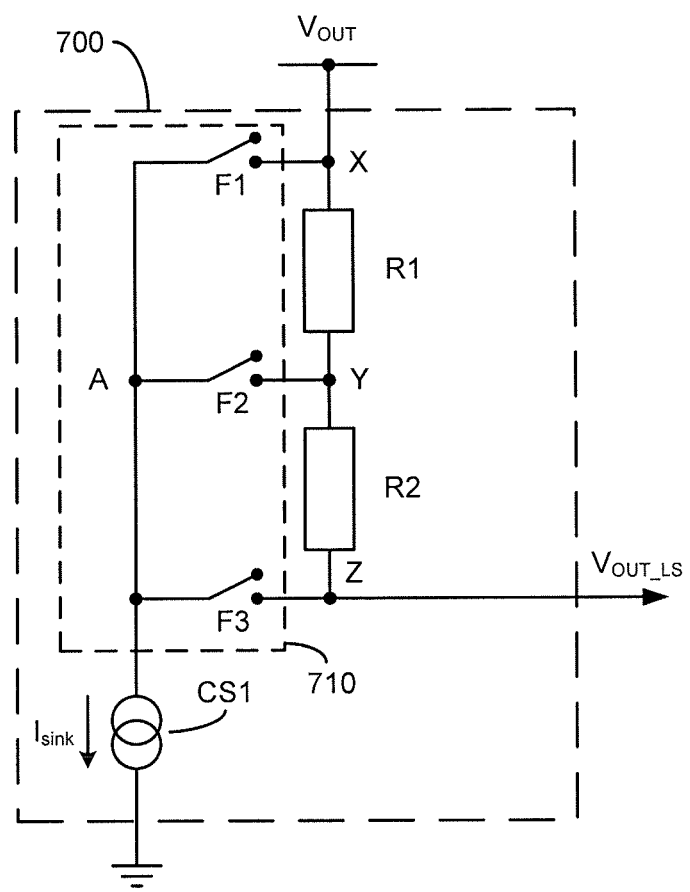
FIG. 7a shows level-shifting circuitry according to a yet further embodiment of the present invention.

FIG. 7a shows a further level-shift circuit 700 according to embodiments of the present invention.

The level-shift circuit 700 is similar to the circuit 400 described with respect to FIG. 4a. However, the circuit 700 comprises three force switches F1, F2 and F3 and no sense switches. That is, the sense path is established between node Z, at the end of the string of resistors R1, R2 (but will in practice extend to whichever resistor is forced), and the output. Similar to circuit 400, the output of circuit 700 is coupled to a high-impedance component.

Figure 7B:
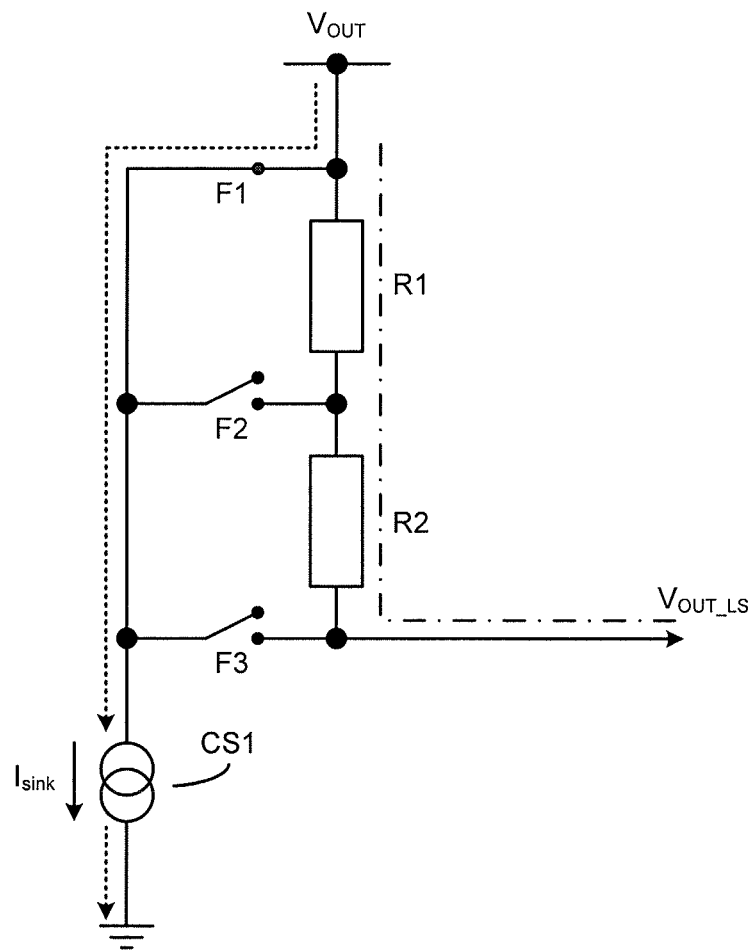

FIG. 7b shows the operation of the circuit 700 when switch F1 is closed. The other force switches, F2, F3 are open. The desired outcome of this mode of operation is to provide a level-shifted voltage $V_{OUT\_LS}$ that is the same as the input voltage $V_{OUT}$.

The dotted line shows the flow of the majority of the current (i.e. the "substantially all" of the current that is forced through the force switch F1). The chain line in FIG. 7b shows the 'sense' path. The voltage at node X is $V_{OUT}$, and the voltage at node A is $V_{OUT}-(I_{leak} \cdot R_{ONF1})$, where $R_{ONF1}$ is the on-resistance of the force switch F1. The sense path comprises the two resistors R1 and R2; however, because substantially no, or at least negligible, current flows through the sense path, the voltage at the output is substantially $V_{OUT}$. That is, there is no, or at least negligible, voltage drop across the two resistors R1 and R2. The level-shifted voltage $V_{OUT\_LS}$ is therefore, to a first order, substantially equal to $V_{OUT}$.

Figure 7C:
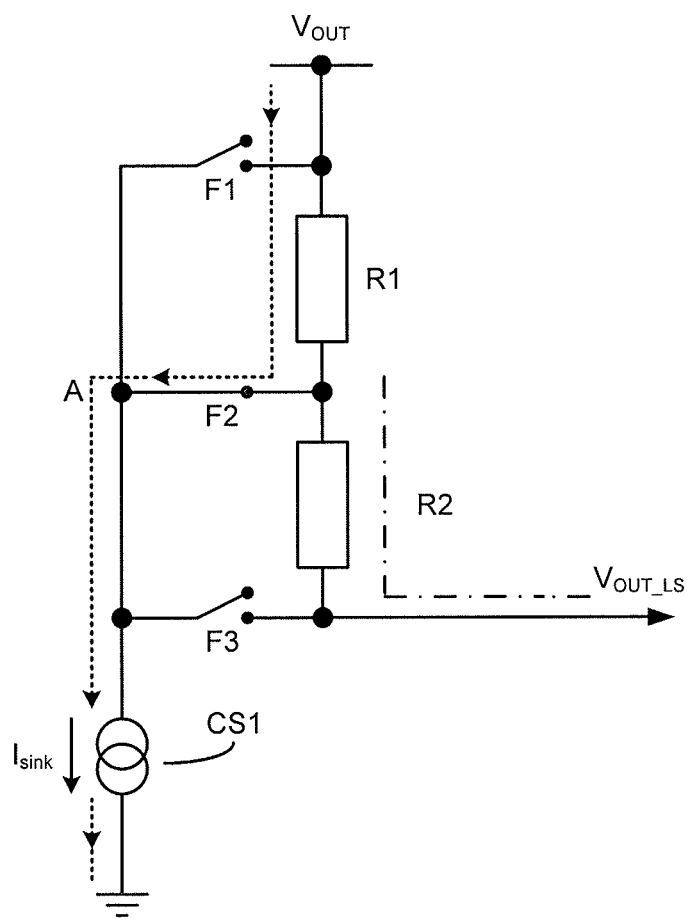

FIG. 7c shows the operation of the level-shift circuit 700 when switch F2 is closed. The two other switches F1 and F3 are both open. The desired outcome of this mode of operation is to provide a level-shifted voltage $V_{OUT\_LS}$ that is equal to the input voltage $V_{OUT}$ shifted down by an amount $I_{sink} \cdot R1$, i.e. $V_{OUT\_LS} = V_{OUT} - I_{sink} \cdot R1$.

The dotted line shows the flow of the majority of the current (i.e. the "substantially all" of the current that is forced through the force switch F2). The chain line in FIG. 7c shows the 'sense' path. The voltage at node X is $V_{OUT}$, and the voltage at node Y is $V_{OUT}-(I_{sink} \cdot R1)$. The voltage at node A is therefore $V_{OUT}-(I_{sink} \cdot R1)-(I_{leak} \cdot R_{ONF2})$, where $R_{ONF2}$ is the on-resistance of the force switch F2. The sense path comprises the resistor R2; however, because substantially no, or at least negligible, current flows through the sense path, the voltage at the output is substantially $V_{OUT}-(I_{sink} \cdot R1)$. That is, there is no, or at least negligible, voltage drop across the resistor R2. The level-shifted voltage $V_{OUT\_LS}$ is therefore substantially equal to $V_{OUT}-(I_{sink} \cdot R1)$.

Figure 7D:
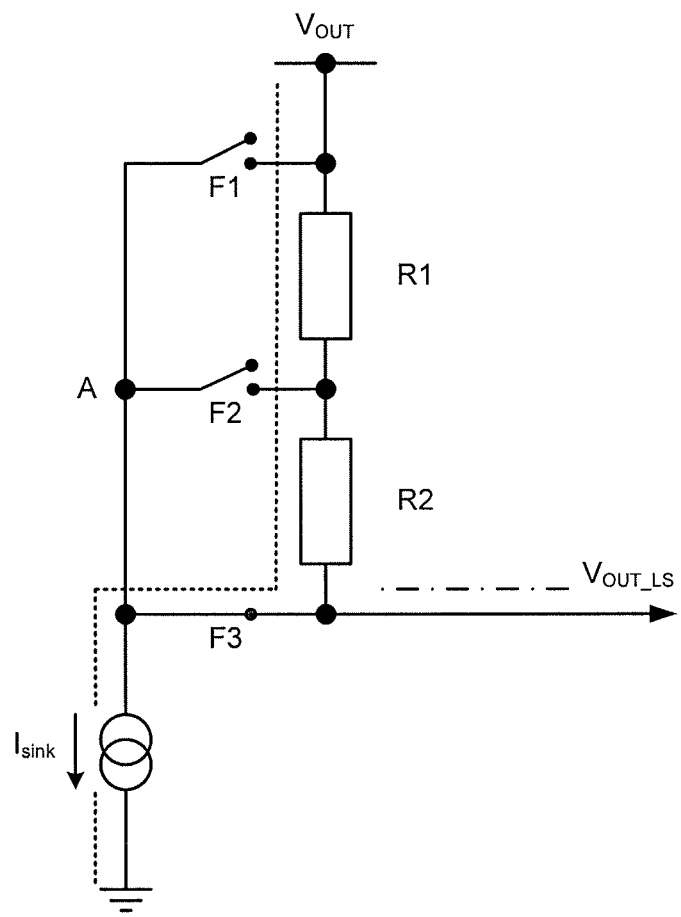

FIG. 7d shows the operation of the level-shift circuit 700 when switch F3 is closed. The two other switches F1 and F2 are both open. The desired outcome of this mode of operation is to provide a level-shifted voltage $V_{OUT\_LS}$ that is the same as the input voltage $V_{OUT}$ shifted down by an amount $I_{sink} \cdot (R1+R2)$, i.e. $V_{OUT\_LS} = V_{OUT} - I_{sink} \cdot (R1+R2)$.

The dotted line shows the flow of the majority of the current (i.e. the "substantially all" of the current that is forced through the force switch F3). The chain line in FIG. 7d shows the 'sense' path. The voltage at node X is $V_{OUT}$, the voltage at node Y is $V_{OUT}-(I_{sink} \cdot R1)$ and the voltage at node Z is $V_{OUT}-(I_{sink} \cdot R1)-(I_{sink} \cdot R2)$. The voltage at node A is $V_{OUT}-(I_{sink} \cdot R1)-(I_{sink} \cdot R2)-(I_{leak} \cdot R_{ONF3})$, where $R_{ONF3}$ is the on-resistance of the force switch F3. The level-shifted voltage $V_{OUT\_LS}$ is therefore substantially equal to $V_{OUT}-(I_{sink} \cdot R1)-(I_{sink} \cdot R2)$.

It will be further apparent to those skilled in the art that level-shift circuits according to the present invention need not have force switches connected between each of the resistors in the series-connected string of resistors. All that is required is that enough force switches are provided to give flexibility in the event that the level shifter input voltage falls. For example, if no force switches are provided (i.e. the force path is fixedly connected to the end of the string of resistors) the current is forced through each of the resistors in the string, and if the input voltage falls below the sum of I.R drops across each resistor, the level-shift circuit will cease to function. By providing a plurality of possible force paths through different numbers of resistors, the present invention allows the choice of a force path which gives sufficient "headroom" (i.e. excess voltage over the sum of IR drops in the chosen force path) to allow the current sink CS1 to continue to operate.

In examples where non-zero, but fewer numbers of force switches are provided, the circuit may comprise a combination of force switches and sense switches to select a particular level-shift to be applied, and to ensure continued operation of the current sink (i.e. sufficient headroom).

FIG. 8 shows a level-shift circuit 800 according to one embodiment employing such a combination. However, it will be apparent to those skilled in the art that any number of resistors may be provided, and alternative configurations of force and sense switches are possible within the scope of the present invention.

The level-shift circuit 800 comprises an input, for receiving an input voltage $V_{OUT}$. Connected in series to the input are three resistors R1, R2 and R3. Four nodes W, X, Y and Z are interleaved with the three resistors R1, R2 and R3. Node W is connected between the input and the first resistor R1; node X is connected between the first resistor R1 and the second resistor R2; node Y is connected between the second resistor R2 and the third resistor R3; and node Z is connected after the second resistor R2.

Connected to each of the nodes W, X, Y, Z is a force switch and/or a sense switch. This allows each node to be selected as the possible level-shift. However, it will be apparent to those skilled in the art that one or more nodes may not be selectable for implementation reasons (i.e. those nodes may not have a switch connected to them), without departing from the scope of the invention. For example, a design with fewer switches utilizes less chip area, and may reduce parasitic capacitance coupling between switches.

Connected to node W is a sense switch S1; connected to node X is a force switch F2; connected to node Y is a sense switch S3; and connected to node Z are force switch F4 and sense switch S4.

The level-shift circuit 800 further comprises a current sink CS1 that is connected at one terminal to each of the force switches F2 and F4, and at the other terminal to a voltage (in the illustrated embodiment this voltage is ground) for example.

An output of the level-shift circuit 800 is connected to each of the sense switches S1, S3 and S4, for providing the level-shifted voltage $V_{OUT\_LS}$. Further, the output of the level-shift circuit 800 should preferably, for optimum performance, be coupled to a relatively high input impedance component, as mentioned above.

The voltage at each respective node represents one possible "level shift" of the input voltage $V_{OUT}$, depending on which switches are closed.

In operation, one of the force switches and one of the sense switches are closed at any one time so that the voltage at one of the nodes W, X, Y, Z may be output as the level-shifted voltage $V_{OUT\_LS}$. In practice it is the earliest node in the chain (i.e. that node closest to $V_{OUT}$) that is connected to a closed switch (whether a force switch or a sense switch) that provides the level shift in the output voltage. In other words, the junction of force and sense paths may be provided either by a force switch or a sense switch providing a force path or sense path away from the resistor chain.

For example, switch S1 is closed to read the voltage at node W (with the other sense switches remaining open). In order to establish a force path through which the majority of current flows (therefore ensuring that the level-shifted voltage $V_{OUT\_LS}$ is a more accurate representation of the voltage at node W), either of the force switches F2 or F4 may be closed. However, in order to ensure that the voltage across the current sink CS1 is adequate, force switch F2 may be closed, so that only the I.R drop through resistor R1 affects the voltage across the current sink CS1.

In order to read the voltage at node X, force switch F2 is closed. Either or both of the sense switches S3 and S4 may be closed to read the voltage at node X, as substantially no current flows through the sense path so established. Preferably sense switch S3 is closed, as the resultant small IR drop over resistor R2 due to leakage current will be lower than over both resistors R2 and R3 (if S4 is closed). However, any such I.R drops are likely to be negligible, as previously stated.

In a similar way, in order to read the voltage at node Y, sense switch S3 and force switch F4 are closed; and in order to read the voltage at node Z, sense switch S4 and force switch F4 are closed.

The level-shift circuit 800 shows that many combinations of sense switches and force switches are possible in order to read the voltage at various nodes in the string of resistors. By establishing a force path at, or shortly after the node (i.e. later in the resistor chain) where the voltage is sensed, sufficient headroom voltage can be ensured across the current sink CS1 to allow continued operation of the circuit.

Figure 9:
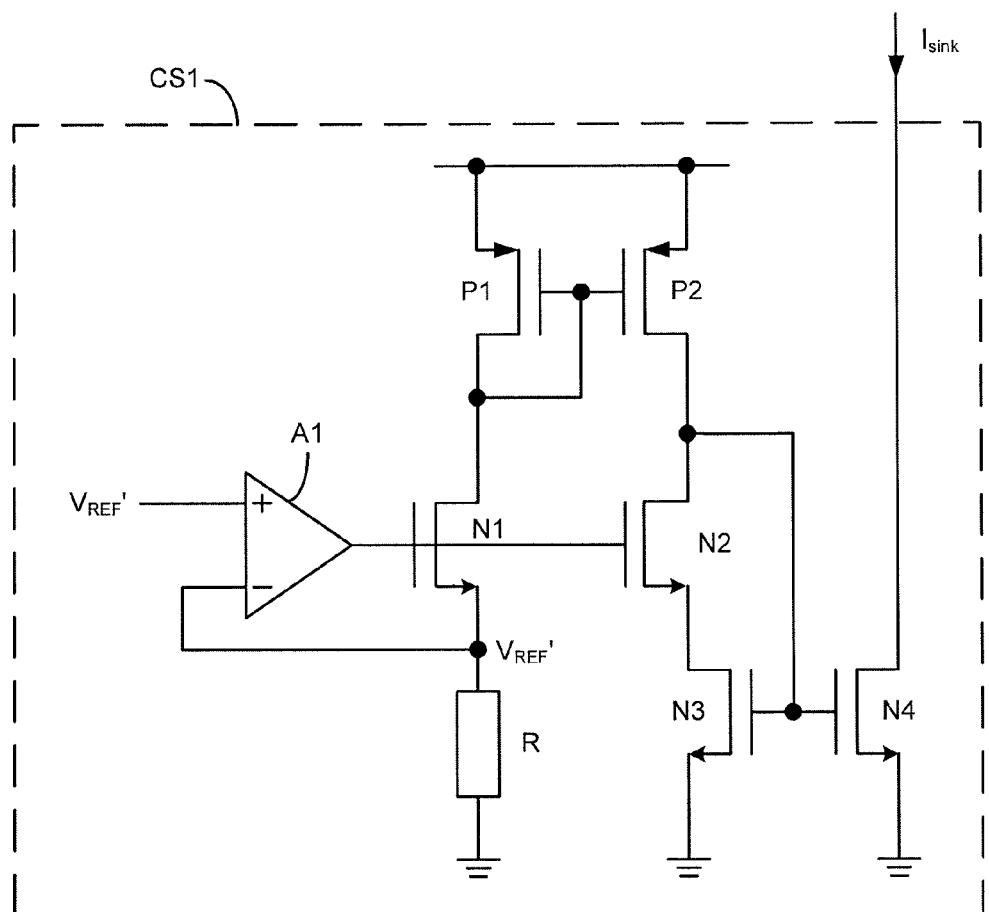
FIG. 9 shows an example of a current sink for use in the level-shifting circuitry according to the present invention.

FIG. 9 shows an example of the current sink CS1 according to one embodiment for use in any of the level-shift circuits 400, 500, 600, 700, 800 described above. However, those skilled in the art will appreciate that many possible current sinks can perform the operation of the current sink CS1 set out above, without departing from the scope of the invention as set out in the claims appended hereto.

According to the illustrated embodiment, the current sink CS1 comprises an amplifier A1 that receives at one input a reference voltage $V_{REF}'$. In embodiments where the level-shift circuit is employed in a DC-DC converter as described with respect to FIG. 2, $V_{REF}'$ may be the same reference voltage $V_{REF}$ as used as an input to the OTA 206; however, the two reference voltages $V_{REF}'$ and $V_{REF}$ do not necessarily have to be the same. The output of the amplifier A1 is provided to the gate terminal of an NMOS transistor N1. The source terminal of the transistor N1 is connected to an inverting input of the amplifier A1. The source terminal of the transistor N1 is further connected in series to a resistor R, connected between the transistor N1 and ground.

The drain terminal of transistor N1 is connected to the gate and drain terminals of a PMOS transistor P1. The source terminal of the PMOS P1 is connected to a positive supply rail. A further PMOS transistor P2 is connected in a current mirror arrangement with the transistor P1. That is, the gate terminal of the transistor P2 is connected to the gate terminal of the transistor P1, and the source terminal of the transistor P2 is also connected to the positive supply rail. The drain terminal of the transistor P2 is connected to a further pair of NMOS transistors N3, N4 configured in a current mirror arrangement. Thus, the drain terminal of the transistor P2 is connected to the gate terminal of an NMOS transistor N3 and to the gate terminal of an NMOS transistor N4. The respective source terminals of the transistors N3, N4 are both connected to ground. Conveniently, a further NMOS transistor N2 is connected to the output of the amplifier A1 and acts as a cascode for the current mirror arrangement of transistors N3 and N4. Thus, the output of the amplifier A1 is connected to the gate terminal of the transistor N2; the gate terminals of the transistors N3 and N4 are connected to the drain terminal of the transistor N2; and the drain terminal of transistor N3 is connected to the source terminal of transistor N2. The drain terminal of the transistor N4 is connected to an input terminal of the current sink CS1, such that the drain-source current in the transistor N4 sinks the current $I_{sink}$. Thus, the example embodiment of the current sink CS1 in FIG. 9 may represent the current sink in each of the level-shift circuits 400, 500, 600, 630, 640, 700, 800.

In one embodiment, the resistor R is made of the same material as the resistors R1 to $R(2^N-1)$; the resistor R may also be placed physically close to, or interleaved with the resistors R1 to $R(2^N-1)$ on an integrated circuit incorporating the level-shift circuit 400, 500, 600, 630, 640, 700, or 800. Thus, temperature variations or other manufacturing conditions that affect the resistance values of the resistors R1 to $R(2^N-1)$, also affect the resistor R in the current sink in substantially the same way. This makes the voltage dropped across R1 a programmable constant proportion of the voltage reference $V_{REF}'$ used to create $I_{sink}$.

In more detail, feedback around A1 forces $V_{REF}'$ across R so the current generated through resistor R will be equal to $V_{REF}'/R$. This is subject to multiplication by the current mirror ratio $A_P$ of mirror P1, P2, then by the current mirror ratio $A_N$ of mirror N1, N2 before being imposed across the chosen resistors in the resistor array. Thus the voltage across R1, say, will be:

$$\Delta V1 = I_{sink} \cdot R1 = V_{REF}' \cdot A_P \cdot A_N \cdot R1/R$$

$A_P$ and $A_N$ are determined by the ratios of device sizes of the transistor sizes in each pair, preferably composed of multiple transistor elements to give an accurate and rational ratio. Similarly R1 and R are preferably composed of multiples of a unit resistor element, so this term is also a rational ratio. Thus the voltage drop imposed by R1 (and similarly for each successive resistor) will be a rational fraction or ratio of the voltage reference used to generate the current source. Typically this will be the same reference voltage used to define the output voltage, so the voltage step between successive codes of $V_{SEL}$ will be a well-controlled predictable rational multiple of this common reference voltage.

Figure 10:
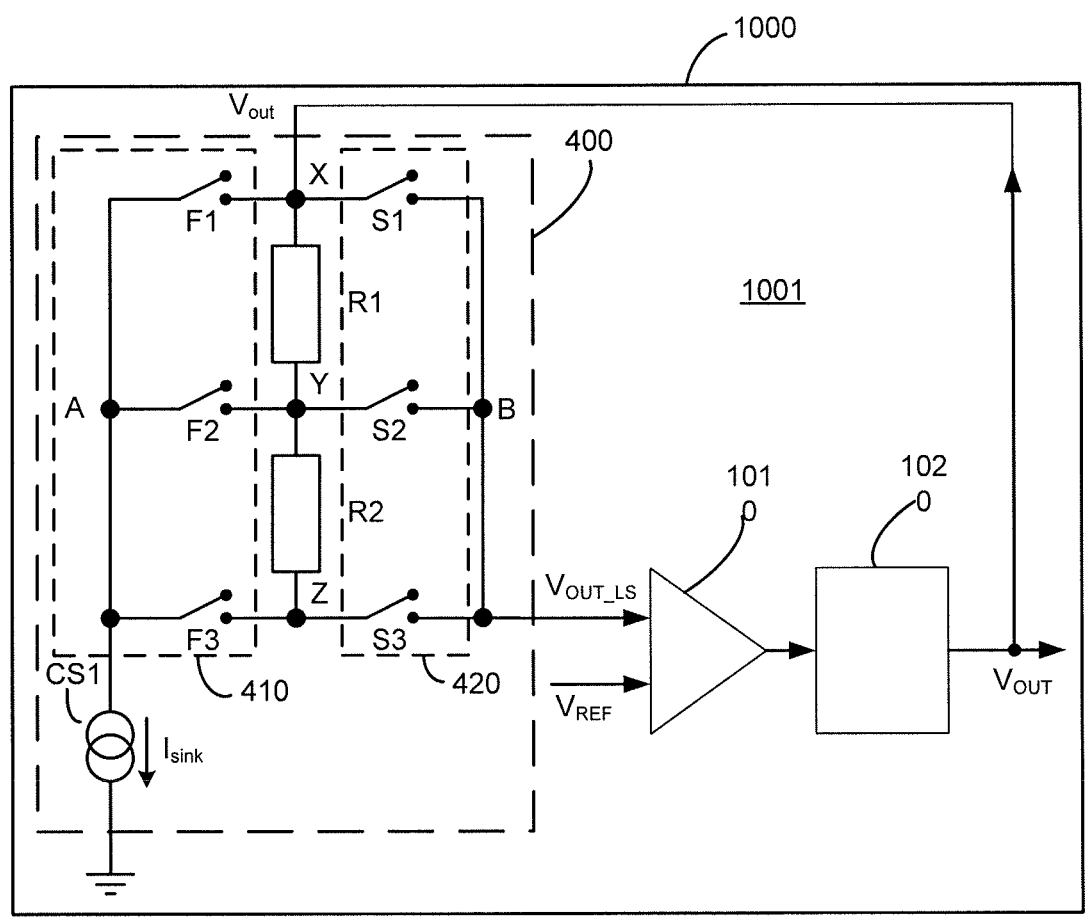
FIG. 10 shows a device comprising a level-shift circuit according to embodiments of the present invention in the feedback loop of a larger circuit.

FIG. 10 shows a device 1000 comprising a level-shift circuit according to the present invention as part of a larger circuit 1001 comprising a feedback path. The larger circuit 1001 may be a power regulator, such as a DC-DC converter, or another circuit for driving an accurate programmable output voltage for example that may be derived from either a bandgap or non-bandgap voltage reference circuit, such as: an LDO; a standalone output voltage reference; an output voltage regulating charge pump, etc.

The circuit comprises comparison circuitry 1010 that receives a reference voltage $V_{REF}$ and a level-shifted feedback voltage $V_{OUT\_LS}$, and compares the two voltages. For example, the comparison circuitry 1010 may comprise a comparator, or an operational transconductance amplifier (OTA), or an operational amplifier (OPAMP). The comparison circuitry 1010 provides a comparison signal to an output stage 1020, which generates therefrom an output voltage $V_{OUT}$. The output voltage $V_{OUT}$ is fed back via a level-shift circuit according to the present invention, generating the level-shifted output voltage $V_{OUT\_LS}$. In the illustrated embodiment, the level-shift circuit is the circuit 400 as described with respect to FIG. 4a; however, it will be apparent that any level-shift circuit according to embodiments of the present invention may be used.

The action of the feedback path and the comparison circuitry 1010 is to force the output voltage $V_{OUT}$ to a level where the level-shifted voltage $V_{OUT\_LS}$ is equal to the reference voltage $V_{REF}$. Thus, in the steady state, the voltage across the current sink CS1 is also equal to $V_{REF}$, i.e. it is held above a threshold voltage that allows the current sink CS1 to operate correctly. In the case of the level-shift circuit 800, the voltage across the current sink CS1 may be slightly lower than $V_{REF}$, due to one or more resistors in the force path after the node at which the voltage $V_{OUT\_LS}$ is sensed. However, this should still be within acceptable limits to allow an appropriately designed current sink CS1 to operate correctly.

The device 1000 may be any one of comprising: mobile computing devices such as laptops, netbooks, PDAs and the like; mobile communication devices such as radio telephones, cellular telephone, mobile email devices and the like; personal media players such as MP3 or other audio players, personal radios, video players; portable video game consoles and devices; personal navigation devices such as satellite navigators and GPS receivers, whether in-vehicle or handheld or any other portable or battery operated device.

The present invention therefore provides a level-shifter, or voltage-shifter, block, which provides an output voltage that is a predictable and accurate function of its input voltage. The level-shift circuit can robustly handle input voltages that vary during use. Moreover, the level-shifting block has unity small-signal gain regardless of the particular level shift that is selected.

The present invention also provides a circuit comprising a level-shift circuit in a feedback path, wherein a voltage across the current sink in the level-shift circuit is held at a substantially constant level above that required to operate.

The terms "level-shifting block", "level-shifter", etc, as used herein and equivalent terms such as "voltage shifter" and "floating voltage source", etc are considered to have substantially the same meaning, which is any block or circuit that receives a first, input voltage, shifts that voltage down a certain amount or does not shift the input voltage at all, and outputs a second, output voltage that is a function of the input voltage.

Where an effect is termed "negligible" it does not imply that it is undetectable when measured to high enough resolution, especially when the effect, such as leakage, may get worse at extremes of temperature, say. Rather, a negligible term is one which is not severe enough to make up a large part of a tolerance budget relative to the desired specified performance. That is, a term which is tolerable, allowing the circuit to achieve its desired performance.

Whilst the above embodiments have been described in relation to a DC-DC buck converter the embodiments of the invention can be applied generally to any switching regulators. The switching regulator may be part of a power management apparatus such as a power management integrated circuit (i.e. a PMIC). The embodiments of the invention may be useful for power management of any sub-systems of any form of electrical device, whether having a single power source or multiple power sources and whether portable or not. The embodiments of the present invention are particularly applicable to devices that require accurate supply voltages and that require improved load transient response such as portable devices non-exhaustively comprising: mobile computing devices such as laptops, netbooks, PDAs and the like; mobile communication devices such as radio telephones, cellular telephone, mobile email devices and the like; personal media players such as MP3 or other audio players, personal radios, video players; portable video game consoles and devices; personal navigation devices such as satellite navigators and GPS receivers, whether in-vehicle or hand-held or any other portable or battery operated device.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

What is claimed is:

1. A level-shift circuit, comprising:
    an input, for receiving a first voltage;
    an output, for outputting a second voltage;
    a resistor array comprising a plurality of resistors connected in series to the input;
    a current sink for providing a current that is independent of the first voltage;
    a first switch arrangement comprising a first plurality of switches connected between terminals of the resistor array and an input of the current sink, for establishing a selected one from a plurality of force paths between the current sink and the input, said selected force path comprising a selected number of said plurality of resistors of said resistor array; and
    a second switch arrangement comprising a second plurality of switches connected between the output and terminals of the resistor array that provides a sense path between the resistor array and the output that does not comprise any of said first plurality of switches used to establish each of said plurality of force paths.

2. A level-shift circuit as claimed in claim 1, wherein the first switch arrangement comprises:
    a first switch connection on a high side of said plurality of resistors of said resistor array; and
    a second switch connection on a low side of said plurality of resistors of said resistor array.

3. A level-shift circuit as claimed in claim 1, said first switch arrangement comprising:
    at least one intermediate switch connection to a common node of a pair of adjacent resistors of said plurality of resistors.

4. A level-shift circuit as claimed in claim 3, wherein said first switch arrangement comprises a plurality of respective intermediate switch connections to common nodes of pairs of respective adjacent resistors of said plurality of resistors.

5. A level-shift circuit as claimed in claim 2, wherein said first switch arrangement comprises a switch connected between two terminals of said plurality of resistors.

6. A level-shift circuit as claimed in claim 1, wherein the second plurality of switches is for establishing a selected one from a plurality of sense paths between the resistor array and the output.

7. A level-shift circuit as claimed in claim 6, wherein the second switch arrangement comprises:
    a third switch connection on a high side of said plurality of resistors of said resistor array; and
    a fourth switch connection on a low side of said plurality of resistors of said resistor array.

8. A level-shift circuit as claimed in claim 6, said second switch arrangement comprising:
    at least one second intermediate switch connection to a common node of a pair of adjacent resistors of said plurality of resistors.

9. A level-shift circuit as claimed in claim 8, wherein said second switch arrangement comprises a plurality of second respective intermediate switch connections to common nodes of pairs of respective adjacent resistors of said plurality of resistors.

10. A level-shift circuit as claimed in claim 6 wherein the first and second switch arrangements are controllable such that a single switch of the first plurality of switches and a single switch of the second plurality of switches are closed at any one time.

11. A level-shift circuit as claimed in claim 10, wherein said single switch of the first plurality of switches and said single switch of the second plurality of switches are connected to the same resistor terminal.

12. A level-shift circuit as claimed in claim 6, wherein the sense path comprises a resistor of the resistor array.

13. A level-shift circuit as claimed in claim 12, wherein the force path comprises a resistor of the resistor array coupled between the sense path and the current sink.

14. A level-shift circuit as claimed in claim 1, wherein each resistor of said plurality of resistors has the same value of resistance.

15. A level-shift circuit as claimed in claim 1, wherein, in use, the output is coupled to a relatively high impedance component, such that a relative majority of current flows through the force path and a relative minority of current flows through the sense path.

16. A level-shift circuit as claimed in claim 1, wherein the current sink comprises a second resistor, and the value of the current generated by the current sink is inversely proportional to the resistance of the second resistor.

17. A level-shift circuit as claimed in claim 16, wherein the current sink has an input for receiving a reference voltage and wherein the value of the current generated by the current sink is proportional to said reference voltage.

18. A level-shift circuit as claimed in claim 16, wherein the second resistor is manufactured using the same material as the plurality of resistors in said resistor array.

19. A level-shift circuit as claimed in claim 18, wherein the second resistor is manufactured using unit elements of the same type as unit elements used to manufacture the plurality of resistors in said resistor array.

20. A level-shift circuit as claimed in claim 16, wherein the second resistor is physically located adjacent to, or interleaved with, the plurality of resistors of said resistor array.

21. A level-shift circuit as claimed in claim 1, wherein the current sink comprises a MOS transistor and said current is the drain current of the MOS transistor.

22. A circuit, comprising:
a circuit input, for receiving a reference voltage;
a circuit output, for outputting an output voltage;
a feedback path coupled to said circuit output, comprising a level-shift circuit as claimed in claim 1; and
control circuitry, for comparing said reference voltage and said second voltage, and controlling said output voltage in dependence on said comparison.

23. A circuit as claimed in claim 22, wherein said control circuitry comprises a comparator or amplifier.

24. A circuit as claimed in claim 22, wherein the output voltage is said first voltage.

25. A circuit as claimed in claim 22, wherein the circuit is a power regulator circuit.

26. An integrated circuit comprising a level-shift circuit as claimed in claim 1.

27. An electronic device comprising a level-shift circuit as claimed in claim 1.

28. An electronic device as claimed in claim 27 wherein the device is one of: a portable computing device; a laptop computer; a personal data assistant; a personal media player; an mp3 player; a portable television; a mobile communications device; a mobile telephone; a navigation aid; a GPS device; a game console.

29. A level-shift circuit, comprising:
an input, for receiving a first voltage;
an output, for outputting a second voltage;
a resistor array comprising a plurality of resistors connected in series to the input;
a current sink for providing a current that is independent of the first voltage;
a first switch arrangement connected between an input of the current sink and terminals of the resistor array, the first switch arrangement comprising a first plurality of switches for establishing a selected one from a plurality of force paths between the current sink and the input, said selected force path comprising a selected number of said plurality of resistors of said resistor array; and
a second switch arrangement comprising a second plurality of switches connected between the output and terminals of the resistor array, said second switch arrangement providing a sense path between a node of the resistor array and the output, said sense path meeting but not comprising any of said selected force path.

30. A level-shift circuit, comprising:
an input, for receiving a first voltage;
an output, for outputting a second voltage;
a resistor array comprising a plurality of resistors connected in series to the input;
a current sink for providing a current that is independent of the first voltage;
a first switch arrangement connected between an input of the current sink and terminals of the resistor array, the first switch arrangement comprising a first plurality of switches for establishing a selected one from a plurality of force paths between the current sink and the input, said selected force path comprising a selected number of said plurality of resistors of said resistor array; and
a second switch arrangement comprising a second plurality of switches coupled between the output and terminals of the resistor array, said second switch arrangement providing part or all of a sense path between a node of the resistor array and the output, said sense path meeting the force path at said node but not comprising any resistors or switches of said selected force path.

31. A method of providing a level-shifted voltage from a first voltage, the method comprising:
receiving the first voltage at an input;
establishing a selected one from a plurality of force paths between a current sink and the input by controlling a first plurality of switches connected between terminals of a resistor array and an input of the current sink, said selected force path comprising a selected number of a plurality of resistors of the resistor array, said resistor array being coupled in series to the input, said current sink providing a current that is independent of the first voltage;
establishing a sense path by controlling a second plurality of switches connected between terminals of the resistor array and an output that does not comprise any switches of the first plurality of switches used to establish each of said plurality of force paths; and
outputting said level shifted voltage at said output.

32. A method of operating a circuit, comprising:
receiving a reference voltage and a feedback voltage;
comparing said reference voltage and said feedback voltage,
generating a circuit output voltage in dependence on said comparison; and
providing said feedback voltage, level-shifted from said circuit output voltage according to the method of claim 31.

* * * * *